July 21, 1959   H. G. BOYNTON ET AL   2,896,001
PROCESS FOR ALKYLATING AROMATIC HYDROCARBONS
Filed Sept. 27, 1957
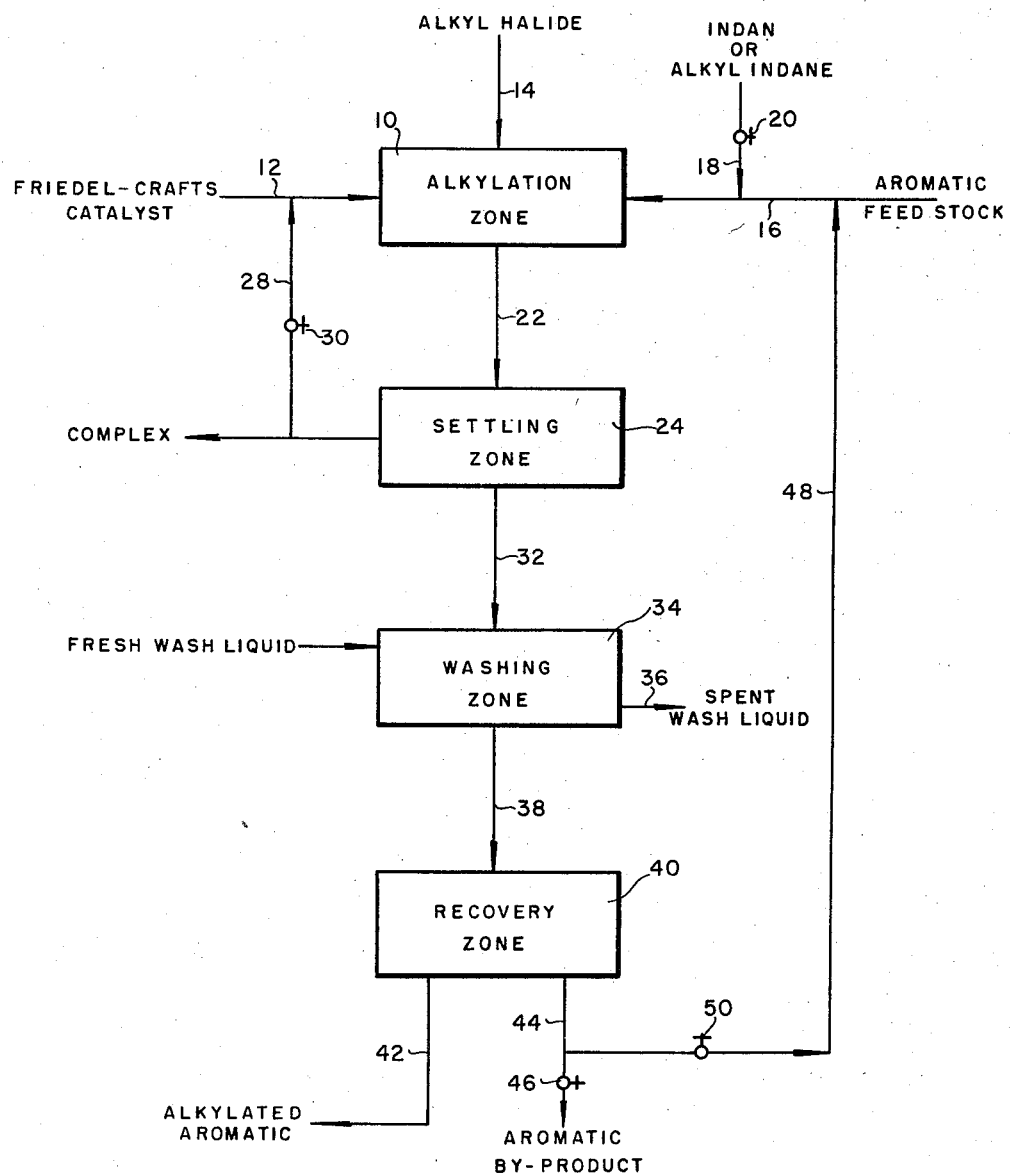
INVENTORS.
HARRY G. BOYNTON,
WILLIAM R. EDWARDS,
BY
Carl G. Riles
ATTORNEY.

2,896,001
PROCESS FOR ALKYLATING AROMATIC HYDROCARBONS

Harry G. Boynton and William R. Edwards, Baytown, Tex., assignors, by mesne assignments, to Esso Research and Engineering Company, Elizabeth, N.J., a corporation of Delaware Application September 27, 1957, Serial No. 686,746

7 Claims. (Cl. 260—671)

This invention relates to a process for alkylating aromatic hydrocarbons. More particularly, this invention relates to a Friedel-Crafts aromatic alkylation process for the preparation of alkylated aromatic hydrocarbons.

In the alkylation of an aromatic hydrocarbon with an alkyl halide in the presence of a Friedel-Crafts catalyst, it is desirable to provide for a maximized catalyst activity which may be measured, for example, in terms of the amount of alkyl halide converted per unit of reaction time. It has been discovered in accordance with the present invention that Friedel-Crafts catalyst efficiency is materially reduced during alkylation reactions through the formation of stable phenonium ions which complex with the Friedel-Crafts catalyst with sufficient strength to inhibit the catalytic activity of the thus-complexed Friedel-Crafts catalyst.

It has further been discovered in accordance with the present invention that enhanced Friedel-Crafts catalyst activity may be achieved in the alkylation of aromatic hydrocarbons with alkyl halides by conducting the alkylation reaction in the presence of an amount of indan sufficient to inhibit the formation of stable alkylation-inhibiting phenonium ions.

Suitable aromatic feed stocks for the present invention include benzenoid hydrocarbon feed stocks composed of compounds such as benzene, $C_7$ to $C_{12}$ methyl benzenes, $C_8$ to $C_{13}$ ethyl benzenes, etc. and mixtures thereof. The benzenoid feed stock is alkylated with an alkyl halide such as methyl chloride or ethyl chloride in the presence of a catalytic amount of a Friedel-Crafts catalyst such as anhydrous aluminum chloride, anhydrous ferrous chloride, boron trifluoride, stannic chloride, zinc chloride, antimony pentachloride, etc. The amount of Friedel-Crafts catalyst to be employed may be varied within comparatively wide limits. Thus, for example, from about 0.001 to about 1 mol of Friedel-Crafts catalyst per mol of benzenoid feed stock may be employed with satisfactory results. It is generally preferable to employ from about 0.01 to about 0.1 mol of Friedel-Crafts catalyst per mol of benzenoid feed stock. The amount of alkyl halide to be employed will be dependent on the extent to which benzenoid starting material is to be alkylated. Thus, for example, if it is desired to add about 1 mol of alkyl group per mol of benzenoid starting material, at least about 1 mol of alkyl halide should be employed. When greater or lesser degrees of alkylation are desired, the amount of alkyl halide to be employed is correspondingly adjusted. The reaction conditions to be employed will be dependent, in a specific instance, upon the chemical identity of the Friedel-Crafts catalyst to be employed. For example, with anhydrous aluminum chloride the alkylation reaction may be conducted at temperatures within the range of about 50° to 350° F. at pressures within the range of about 0 to 50 p.s.i.g. for a reaction time within the range of about 10 to 0.1 hour, the required reaction time decreasing as temperature and pressure are increased. With aluminum chloride it is generally preferable to employ a reaction temperature of about 275° to 300° F. at atmospheric pressure in order to obtain the desired degree of alkylation with a reaction time of less than about 1 hour.

The alkylation reaction proceeds by a reaction mechanism involving the formation of normally transitory phenonium ions. Such phenonium ions may be designated generally by the formula:

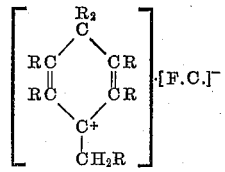

wherein R is hydrogen or an alkyl radical; and wherein F.C. denotes a negatively charged Friedel-Crafts catalyst molecule.

Ordinarily, the phenonium ion is transitory in nature and releases the Friedel-Crafts catalyst molecule through a disassociation reaction involving the addition of an alkyl radical. This is particularly true when R is exclusively hydrogen. However, as the amount of alkyl substitution present on the cyclohexadiene nucleus of the phenonium ion increases, the relative basicity of the phenonium ion increases until a basicity is reached which is sufficient to complex the negatively charged Friedel-Crafts molecule to the phenonium ion so tightly that the complex can be broken only by hydrolysis. When this happens, the catalytic activity of the particular Friedel-Crafts molecule involved is inhibited.

From this it is apparent that it is desirable to inhibit the formation of stable phenonium ions. As indicated previously, this is accomplished in accordance with the present invention by conducting the alkylation reaction in the presence of an added amount of indan sufficient to inhibit the formation of stable phenonium ions. In general, at least about 2 volume percent of indan, based on the benzenoid feed stock, should be employed. It is generally preferable to employ from about 3 to 6 volume percent of indan. The indan to be employed in accordance with the present invention may be indan or an alkyl substituted indane such as mono-, di-, tri-, tetra-, methyl-, or ethyl-substituted indanes or a mixture of a plurality of such indanes.

The present invention will be further illustrated with respect to the accompanying drawing wherein the sole figure is a schematic flow sheet illustrating one manner in which the process of the present invention may be conducted in a continuous phase.

Turning now to the drawing, there is schematically disclosed an alkylation zone 10 wherein an alkylation reaction is continuously conducted by charging a Friedel-Crafts catalyst 12, such as aluminum chloride, an alkyl halide 14, such as methyl chloride or methyl bromide, and an aromatic feed stock 16, such as a polymethyl benzene, to the alkylation zone under alkylation conditions. In addition, an inhibiting amount of indan or an alkyl indane is charged to the alkylation zone 10. This is preferably accomplished by mixing the indane with the benzenoid feed stock in the charge line 16, the indane being introduced into the line 16 by way of a line 18 controlled by a valve 20. For example, the feed stock may consist essentially of pseudocumene and an added indane, the Friedel-Crafts actalyst may be aluminum chloride, and the alkyl halide may be methyl chloride. Within the alkylation zone 10 the aromatic feed stock is alkylated by the alkyl halide, an insoluble Friedel-Crafts complex phase, or "sludge" being formed during the course of the alkylation reaction. A product stream may be continuously discharged from the zone 10 by way of a line 22 leading to a settling zone 24 wherein a Friedel-Crafts complex phase may be settled from the oil phase. The complex may be discarded from the system by way of a discharge line 26 or may be recycled to the Friedel-Crafts catalyst charge line 12 by way of a recycle conduit 28 controlled by a valve 30. The oil phase may be discharged from the settling zone by way of a line 32 leading to a washing zone 34 wherein the oil phase may be washed with a suitable wash liquid to remove residual amounts of alkyl halide and Friedel-Crafts catalyst. Thus, when the Friedel-Crafts catalyst is aluminum chloride, the wash liquid may preferably comprise a dilute solution of sodium hydroxide. Spent wash liquid is discharged from the zone 34 by way of a line 36 and the washed product is discharged by way of a line 38 leading to a recovery zone of any suitable construction. The recovery zone 40 may comprise, for example, one or a plurality of distillation columns, one or a plurality of fractional crystallization units, or a suitable combination of distillation units with fractional crystallization units. Within the recovery zone 40, a desired alkylated aromatic hydrocarbon is separated from the alkylation product for discharge from the system by way of line 42. Additional alkylated aromatic products and unreacted feed stock components are discharged by way of a line 44 controlled by a valve 46. Preferably, all of the aromatic by-product is recycled to the aromatic feed stock charge line 16 by way of a recycle line 48 controlled by a valve 50. In this manner, substantially all of the aromatic feed stock is converted to the desired alkylated aromatic. Thus, in a situation where the feed stock is pseudocumene, the desired alkylated hydrocarbon may be durene and the aromatic by-product may be comprised of a mixture of a minor amount of benzene with $C_7$ to $C_{12}$ methyl benzenes formed during the course of the alkylation reaction by disproportionation and isomerization reactions that accompany the alkylation reaction. By recycle of the aromatic by-product stream, substantially all of the pseudocumene feed stock may be converted to durene.

The invention will be further illustrated by the following specific examples which are given by way of illustration and not intended as a limitation on the scope of this invention.

EXAMPLE I

A charge stock consisting of pseudocumene of about 99 percent purity was alkylated with methyl chloride in the absence of indan at a temperature of about 250° F. employing about 0.14 mol of aluminum chloride per mol of pseudocumene, gaseous methyl chloride being passed through the alkylation reactior at the rate of about 2.0 mols of methyl chloride per mol of pseudocumene per hour. For the purpose of this example, a sample of the aluminum chloride complex phase was obtained after about 15 minutes of reaction. The complex phase was hydrolyzed with ice water and the resultant oil phase was separated from the resultant aqueous phase. The oil phase was subjected to low voltage mass spectroscopic analysis as disclosed in copending Field and Hastings application Ser. No. 626,887, filed December 7, 1956, entitled "Analysis Method."

EXAMPLE II

Example I was repeated with a different feed stock, the feed stock was in this instance consisting of about 95 volume percent of pseudocumene and about 4 volume percent of indan. Again, a sample of the aluminum chloride complex phase was obtained at the end of 15 minutes of reaction.

A summary of the reaction conditions employed and a report of the results obtained are set forth in the following table.

TABLE I

Conditions of runs

Temperature—250° F.
$AlCl_3$ concentration—0.14 mol $AlCl_3$/mol oil.
$CH_3Cl$ charge rate—7.3 mol/hr.
Oil charge to reactor—500 cc. (3.67 mols).

| Run No. ASU-- | 48 | 49 |
|---|---|---|
| Feed | 95% pseudocumene; 4% indan | 99% pseudocumene |

ANALYSIS OF OIL FROM COMPLEX PHASE AFTER 15 MINUTES' REACTION TIME

| Component | Liq. vol. percent by low voltage mass spectrometer | |
|---|---|---|
| $C_8$ benzene | 3.5 | 1.8 |
| $C_9$ benzene | 22.0 | 18.0 |
| $C_{10}$ benzene | 42.4 | 29.5 |
| $C_{11}$ benzene | 13.5 | 19.3 |
| $C_{12}$ benzene | 2.7 | 18.2 |
| $C_{13}$ $C_nH_{2n-6}$ series | 0.2 | 4.1 |
| $C_{14}$ $C_nH_{2n-6}$ series | | 0.8 |
| $C_{11}$ indans | 1.2 | |
| $C_{12}$ indans | 7.8 | |
| $C_{13}$ indans | 1.0 | |
| $C_{13}$ indenes | 0.2 | |
| $C_nH_{2n-20}$ series | 2.8 | |
| Diphenyl series | | 8.3 |
| Pyrenes | 0.8 | |
| Phenanthrenes | 1.9 | |
| | 100.0 | 100.0 |
| $CH_3Cl$ conversion during first 0.25 hrs., percent | 95+ | 71 |

From Table I it will be noted that a methyl chloride conversion in excess of 95% was obtained in the case of the run conducted in the presence of indan whereas only 71% methyl chloride conversion was obtained in the absence of indan. It will be further noted that the amount of hexamethylbenzene ($C_{12}$ benzene in the table) was materially reduced in the case of the run conducted in the presence of indan as contrasted with the run conducted in the absence of indan.

Having thus described our invention, what is claimed is:

1. In a process for alkylating a benzenoid feed stock with an alkyl halide in the presence of a catalytic amount of a metal halide Friedel-Crafts catalyst under Friedel-Crafts alkylation conditions, the improvement for enhancing the activity of said Friedel-Crafts catalyst which comprises conducting said alkylation reaction in the presence of an amount of an added indan insufficient to inhibit the formation of stable phenonium ions.

2. In a process for alkylating a benzenoid feed stock with an alkyl halide in the presence of a catalytic amount of an aluminum chloride catalyst under aluminum chloride alkylation conditions, the improvement for enhancing the activity of said aluminum chloride catalyst which comprises conducting said alkylation reaction in the presence of an amount of an added indan sufficient to hibit the formation of stable phenonium ions.

3. The method which comprises alkylating a benzenoid feed stock with an alkyl halide in the presence of about 0.001 to about 1 mol of aluminum chloride per mol of benzenoid feed stock under reaction conditions including a temperature of 50° to 350° F., a pressure within the range of about 0 to 50 p.s.i.g. and a reaction time of about 10 to 0.1 hour, and recovering an alkylated benzenoid compound from the products of said reaction, said alkylation being conducted in the presence of an amount of an added indan sufficient to inhibit the formation of stable phenonium ions.

4. The method which comprises alkylating a polymethyl benzene feed stock with an alkyl halide in the presence of about 0.001 to about 1 mol of aluminum chloride per mol of polymethyl benzene feed stock under reaction conditions including a temperature of 50° to 350° F., a pressure within the range of about 0 to 50 p.s.i.g. a reaction time of about 10 to 0.1 hour, and recovering an alkylated polymethyl benzene from the products of said reaction, said alkylation being conducted in the presence of an amount of an added indan sufficient to inhibit the formation of stable phenonium ions.

5. A method as in claim 4 wherein the polymethyl benzene is pseudocumene and the alkylated aromatic is durene.

6. A method as in claim 4 wherein the polymethyl benzene is pseudocumene, the alkylated aromatic compound is durene and polymethyl benzene alkylation products other than durene are recycled.

7. The method which comprises continuously alkylating a pseudocumene feed stock with methyl chloride in an alkylation zone in the presence of aluminum chloride and in the further presence of an amount of an indan sufficient to inhibit the formation of stable phenonium ions, continuously withdrawing an alkylation product stream from said alkylation zone and separating the same into a hydrocarbon insoluble catalyst complex phase and an oil phase, continuously recycling said catalyst complex phase to said alkylation zone, continually washing said oil phase with an alkaline wash liquid, continually treating said washed oil phase to provide a first fraction consisting essentially of durene and a second fraction comprising alkylated benzenes formed in said alkylation zone and continuously recycling said second fraction to said alkylation zone, together with said pseudocumene feed stock.

References Cited in the file of this patent

UNITED STATES PATENTS 2,541,044    Daugherty _____ Feb. 13, 1951